2,900,402

PREPARATION OF ALUMINUM ALKYLS

William K. Johnson, Dayton, Ohio, assignor to Monsanto Chemical Company, St. Louis, Mo., a corporation of Delaware No Drawing. Application March 17, 1955
Serial No. 495,039

8 Claims. (Cl. 260—448)

This invention relates to the preparation of aluminum alkyls.

An object of this invention is to provide an improved process for the preparation of aluminum alkyls and particularly the di- and tri-alkyls directly from finely divided aluminum, olefins and hydrogen. A further object is to provide a process by which a high production rate of aluminum trialkyls from aluminum, an olefin and hydrogen may be realized.

The reaction of aluminum hydride with isobutylene to form aluminum triisobutyl has been described in German Patent No. 917,006. In the reaction described in this patent the practice is to employ an excess of the olefin. The reaction is, moreover, very slow.

I have now found that aluminum trialkyls can be prepared conveniently and in excellent yield by a process which utilizes the reaction:

(1) $Al + 3C_4H_8(iso) + 1\frac{1}{2}H_2 = Al(C_4H_9)_3$ 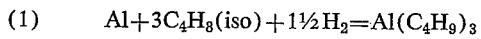

provided the aluminum is used in an excess over that indicated by the above reaction. The excess aluminum employed should preferably be at least 50 mol percent greater and with great advantage can be 100% and even 2,000% or more greater than that indicated by the above equation.

In the event that additional hydrogen is added, beyond that indicated by the Equation 1 above, the product, aluminum triisobutyl, will contain an equivalent quantity of aluminum diisobutyl hydride. The presence of aluminum diisobutyl hydride in the aluminum triisobutyl is desirable for certain catalytic processes. Its formation may take place according to either Reaction 2 or Reactions 3 and 4; or by a combination of these reactions.

(2) $Al(C_4H_9)_3 \rightarrow AlH(C_4H_9)_2 + C_4H_8$ 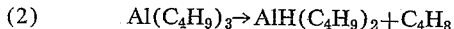
(3) $2Al + 3H_2 \rightarrow 2AlH_3$ 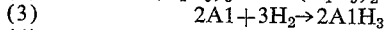
(4) $AlH_3 + 2Al(C_4H_9)_3 \rightarrow 3AlH(C_4H_9)_2$ 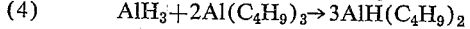

Reaction 2 above proceeds in the indicated direction at about 130° C. and at a pressure of 10 mm. or lower. At this temperature and pressure one mol of isobutylene may be removed from the product per mol of aluminum triisobutyl contained therein and aluminum dibutyl hydride obtained.

Reaction 3 probably occurs generally under the conditions at which Reaction 1 takes place and undoubtedly constitutes an intermediate step or reaction in that process. It is favored by the presence of an excess of aluminum powder in the reaction mass.

Reaction 4, depending upon the presence of a supply of aluminum hydride in the reaction phase, it also favored by the conditions described herein and found to be favorable for Reaction 1 above. Thus, by merely continuing the addition of hydrogen it is possible to convert all of the olefin to the dialkyl aluminum hydride and recover the latter in substantially pure form. On the other hand, it is possible to stop the controlled addition of hydrogen short of complete conversion to dialkyl aluminum hydride, in which event the product consists of a mixture of the aluminum trialkyl and dialkyl aluminum hydride. By proportioning the olefin and hydrogen it is possible to prepare a mixture of trialkyl aluminum and dialkyl aluminum hydride having any desired proportion of these components.

The temperature suitable for carrying out the process will vary with the reactivity of the aluminum powder and the nature of the olefin. A suitable temperature can readily be ascertained by observing the rate of hydrogen uptake by the reaction mass. When starting with a fresh quantity of aluminum powder, the temperature will ordinarily be in the neighborhood of 120°–180° C., generally in the range of 115°–135° C. After the aluminum has become activated, the temperature may be maintained between the range of 110° and 120° C.

Since the reaction is exothermic, it is advantageously controlled by adding hydrogen gas at a rate such that excess heat is removed from the reaction mass and the temperature prevented from reaching the decomposition point of the product. It is also possible to control the reaction by feeding the olefin or a mixture of olefin and hydrogen gas at a rate so that heat removal is adequate to maintain, but not to exceed, the desired temperature. On the whole, I prefer to control the reaction by the controlled addition of hydrogen since this appears to be the most practical.

The process embodying the above reactions is carried out in a stainless steel autoclave, equipped with an efficient stirring device, inlet and exit tubular connections, and also equipped with means for heating and cooling the contents thereof. Because of the sensitivity of the reactants and products to air and moisture, it is necessary that the interior be completely flushed out with pure, dry nitrogen, or other inert gas, a number of times so that all contaminants are eliminated.

The previously dried and deaerated autoclave is charged with the aluminum powder in excess and then a small amount of an aluminum trialkyl, for example aluminum triethyl or aluminum triisobutyl, added to the aluminum powder for the purpose of activating the same. This material may be added as a solution in toluene or otherwise and probably has the effect of removing any adsorbed or combined oxygen present on the aluminum particles. The stirrer is placed in operation and a quantity of isobutylene (or other suitable olefin) is now added and pure hydrogen gas metered into the autoclave. The quantity of olefin is based upon the requirement that an excess of aluminum must be present in the reaction mass. Since one-third mol of aluminum is consumed by reaction with each mol of olefin, the mols of olefin charged should preferably be less than twice the number of mols of aluminum present in the autoclave and preferably should be considerably less than this in order to provide for the excess mentioned above and to realize the full advantage of this invention.

The autoclave is heated to 120° C.—130° C. and hydrogen gas is now metered in under super-atmospheric pressure, the amount of hydrogen added being sufficient to cause all or nearly all of the olefin to react and when preparing the trialkyl, preferably not substantially more than this. The amount of hydrogen reacted can be calculated, if no meter is available, as the amount necessary to increase the pressure from a lower to a higher pressure, say from 900 p.s.i. to 1,000 p.s.i. and then permitting the pressure to drop over this same pressure range, repressuring as necessary until the required amount of hydrogen has combined. Of course, if a meter is available, it will be a relatively simple matter to ascertain the amount of hydrogen absorbed by the reaction. The reactivity of the mass will vary greatly with the activity of the aluminum powder. When starting a series of runs according to this invention, I have found that the first run invariably requires a considerably higher pressure or a longer time than do subsequent runs. For example, the first run may require on the order of 1,000 to 3,000 p.s.i. total pressure (part of this pressure being contributed by the other reactants present) while the next run may require only 700 to 1,000 p.s.i. A third run may require only 50–100 p.s.i. over the partial pressure of the olefin. At the same time the amount of time consumed will be greatly shortened over that required for the first run.

Returning now to the general description of the process, at the completion of the hydrogen addition, stirring is stopped, the autoclave is cooled to about 60° to 70° C., the pressure vented and the larger part of the liquid contents removed. This may be done in any suitable manner such as by decanting or siphoning off the liquid product after permitting the aluminum powder present to settle. A suction tube, provided with a filter, may be used to remove suspended aluminum particles. Desirably a small amount of liquid product is permitted to remain in the autoclave together with the excess of aluminum powder which has not been consumed in the reaction. The amount so permitted to remain is not critical. The liquid product removed from the autoclave is substantially pure aluminum triisobutyl, if no solvent was used. The next run is now started in the autoclave by adding to the heel of aluminum powder and product remaining an amount of fresh aluminum powder corresponding to that consumed in forming the aluminum triisobutyl which was removed in the preceding run. This second run is now carried out just as was the first run, by adding the required amount of isobutylene to the autoclave and pressuring with metered hydrogen gas. In this run, however, the aluminum powder is considerably more active and the rate of hydrogen up-take considerably faster than in the first run.

Subsequent runs are carried out in a similar manner, each run being started by the addition of fresh aluminum powder added to the heel of excess aluminum and product in the autoclave and being concluded by the removal of the product as stated above.

The productivity of the autoclave increases greatly and the yield of product based on olefin is substantially quantitative.

The present process is useful for the production of aluminum trialkyls using any olefin which contains an alpha olefinic double bond joined to a tertiary carbon atom. Thus, any mono-olefin containing the group: $CH_2=C<$, may be used. The dangling valences may be satisfied by any alkyl or alkaryl radicals. Merely by way of example and not by way of limitation, the following olefins may be mentioned: isobutylene; 2-methylbutene-1; 2-methylpentene-1; 2-methylhexene-1; 2-ethylbutene-1; 2-ethylpentene-1; 2-ethylhexene-1; 2-propylbutene-1; 2-butylpentene-1. I may also employ olefins having a phenyl group in the molecule; such as alpha methyl styrene, alpha paradimethyl styrene, etc.

Any finely divided aluminum powder is suitable. I have found that the commercial grade of aluminum powder designated as "pigment" or "thermite" grade is satisfactory. In the following example I employed an aluminum powder having a fineness such that 100% passed through a 100-mesh screen and 80% through a 325-mesh screen. The particles had a size in the range of 19–20 microns.

*Example 1*

A stainless steel autoclave having a volume of 1400 ml., provided with a stirrer, thermowell, inlet and outlet connections, and also provided with external heating and cooling arrangements, was employed.

270 g. (10 mols) of aluminum powder was placed in the autoclave which was then deaerated and filled with pure, dry nitrogen after which 100 ml. of aluminum triisobutyl was added. To the contents was also added 400 g. (7.2 mols) of isobutylene; the autoclave was then closed, the stirrer placed in operation and the contents heated to an internal temperature of 130° C. It was then pressured with $H_2$ to 1,000 p.s.i., which pressure sank to 900 p.s.i. in the course of 30 to 40 minutes. It was repressured again with $H_2$ to 1,000 p.s.i. This repressuring was continued for 6.5 hours. At the conclusion of this period, 3.6 mols of hydrogen had been consumed by the reaction. The stirrer was stopped, the autoclave cooled to about 70° C. and allowed to stand in order to settle the suspended aluminum powder. 2.4 mols of aluminum triisobutyl was siphoned out of the autoclave.

2.4 mols of aluminum powder and 7.2 mols of isobutylene were now added to the autoclave which was then closed, the stirrer started and hydrogen added to a total of 1,000 p.s.i. at 130° C. The pressure dropped quickly to 900 p.s.i. It was repressured to 1,000 p.s.i. as above. This repressuring was repeated until 3.6 mols of hydrogen had been consumed, which required 2.5 hours. The run was terminated as above and 2.4 mols of aluminum triisobutyl removed.

Succeeding runs were carried out as above, the conditions being the same, with the exception that the rate of hydrogen absorbed was now found to be so rapid at 1,000 pounds that the hydrogen pressure could be dropped to 500 p.s.i. Since the vapor pressure of isobutylene at 130° C. was about 450 p.s.i., the reaction now requires only 50 p.s.i. partial pressure of hydrogen. The time for reaction had decreased to two hours. Yield, based on isobutylene=96–100%. Boiling point was 55° C. at 0.7 mm.

*Analysis.* — Theory: Al=13.61%. Found: Al=13.86%.

*Example 2*

To an autoclave containing aluminum powder remaining from a previous run, there was added 2.07 mols of aluminum and 6.6 mols of isobutylene. The reaction mass was heated with stirring, pressured with hydrogen in such an amount so that at a temperature of 128° C. the total pressure in the autoclave was 1,000 p.s.i. The pressure dropped to 900 p.s.i. at which point it was repressured to 1,000 p.s.i. with hydrogen. This repressuring was continued over a period of five hours. The autoclave was then cooled to 70° and a small amount of hydrogen released. All of the isobutylene had reacted. The autoclave was then opened and the product removed. It was filtered to remove excess aluminum powder.

*Analysis.*—Al=16.04%.

This analysis corresponds to a product containing approximately 53 mol percent of aluminum diisobutyl hydride, the remainder being aluminum triisobutyl.

What I claim is:

1. In the preparation of aluminum alkyls by reaction of finely divided aluminum with a mono-olefin containing the group: $CH_2=C<$, and hydrogen, the step of contacting at an elevated temperature and superatmospheric pressure hydrogen with a mixture of aluminum in finely divided form and said olefin, in which mixture aluminum is present in excess over that reacted.

2. The process which comprises contacting at an elevated temperature and superatmospheric pressure aluminum in powder form with a mono-olefin containing the group: $CH_2=C<$, and hydrogen gas, and recovering an aluminum alkyl selected from the class consisting of aluminum trialkyl and dialkyl aluminum hydride, the aluminum being in excess of one-third mol per mol of olefin reacted.

3. The process which comprises contacting at an elevated temperature and superatmospheric pressure aluminum in powder form with a mono-olefin containing the group: $CH_2=C<$, and hydrogen, and recovering an aluminum trialkyl, the aluminum being in excess of one-third mol per mol of olefin reacted, and then reacting said excess of aluminum with additional olefin and hydrogen.

4. The process which comprises contacting at an elevated temperature and superatmospheric pressure aluminum in powder form with isobutylene and hydrogen and recovering aluminum triisobutyl, the aluminum being in excess of one-third mol per mol of isobutylene reacted, and then reacting said excess of aluminum with additional isobutylene and hydrogen.

5. The process which comprises contacting at an elevated temperature and superatmospheric pressure aluminum in powder form with a mono-olefin containing the group: $CH_2=C<$, and hydrogen, and recovering an aluminum trialkyl from the reaction mixture, the reaction mixture containing olefin in molar proportion equivalent to less than twice the number of mols of aluminum present.

6. The process which comprises contacting at an elevated temperature and superatmospheric pressure aluminum in powder form with isobutylene and hydrogen and recovering aluminum triisobutyl from the reaction mixture, said mixture containing isobutylene in a molar proportion equivalent to less than twice the number of mols of aluminum present.

7. The process which comprises contacting at an elevated temperature and superatmospheric pressure aluminum in powder form with a mono-olefin containing the group: $CH_2=C<$, and hydrogen, and forming a dialkyl aluminum hydride, said mixture containing olefin in molar proportion equivalent to less than twice the number of mols of aluminum present.

8. The process which comprises contacting at an elevated temperature and superatmospheric pressure aluminum in powder form with an olefin containing the group: $CH_2=C<$, and hydrogen and forming a mixture of trialkyl aluminum and dialkyl aluminum hydride, said aluminum contacted being in excess of that reacted to produce said mixture of trialkyl aluminum and dialkyl aluminum hydride.

References Cited in the file of this patent

FOREIGN PATENTS 917,006    Germany _____ Aug. 23, 1954

Notice of Adverse Decision in Interference

In Interference No. 90,915 involving Patent No. 2,900,402, W. K. Johnson, Preparation of aluminum alkyls, final decision adverse to the patentee was rendered Sept. 5, 1961, as to claims 2, 3, 4, 5, 6, 7 and 8.
[*Official Gazette August 20, 1963.*]